(12) United States Patent
Choi et al.

(10) Patent No.: US 12,234,763 B2
(45) Date of Patent: Feb. 25, 2025

(54) INTEGRATED HOUSING AND WATER SUPPLY MODULE INCLUDING SAME

(71) Applicant: Hanon Systems, Daejeon (KR)

(72) Inventors: Jungbum Choi, Daejeon (KR); Ho Sung Kang, Daejeon (KR); Gwang Ok Ko, Daejeon (KR); Wontaek Lee, Daejeon (KR); Seong Woo Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/024,449

(22) PCT Filed: Sep. 7, 2021

(86) PCT No.: PCT/KR2021/012165
§ 371 (c)(1),
(2) Date: Mar. 2, 2023

(87) PCT Pub. No.: WO2022/055230
PCT Pub. Date: Mar. 17, 2022

(65) Prior Publication Data
US 2023/0258118 A1   Aug. 17, 2023

(30) Foreign Application Priority Data

Sep. 11, 2020   (KR) .................. 10-2020-0116884

(51) Int. Cl.
*F01P 11/02*       (2006.01)
*F01P 5/10*        (2006.01)
(Continued)

(52) U.S. Cl.
CPC ............... *F01P 11/029* (2013.01); *F01P 5/10* (2013.01); *F01P 7/165* (2013.01); *F01P 11/04* (2013.01); *F01P 2005/105* (2013.01); *F01P 2007/146* (2013.01); *F01P 2050/22* (2013.01); *F01P 2050/24* (2013.01)

(58) Field of Classification Search
CPC .. F01P 11/029; F01P 5/10; F01P 7/165; F01P 11/04; F01P 2005/105; F01P 2007/146; F01P 2050/22; F01P 2050/24
See application file for complete search history.

(56) References Cited

U.S. PATENT DOCUMENTS 6,098,576 A * 8/2000 Nowak, Jr. ......... F02B 29/0443
                                                    123/41.29
2007/0044938 A1   3/2007 Farley
(Continued)

FOREIGN PATENT DOCUMENTS

KR         101765578 B1     8/2017
KR         20180136633 A   12/2018
(Continued)

*Primary Examiner* — Syed O Hasan
(74) *Attorney, Agent, or Firm* — NORTON ROSE FULBRIGHT US LLP (57) ABSTRACT

The present disclosure relates to an integrated housing capable of integrally connecting several components of a water supply module, and the water supply module including same. According to the present disclosure, hoses or pipes are removed or a pipe length is reduced through the integration of components constituting a cooling system, and thus a reduction in size and weight can be promoted.

16 Claims, 12 Drawing Sheets

(51) Int. Cl.
*F01P 7/16* (2006.01)
*F01P 11/04* (2006.01)
*F01P 7/14* (2006.01)

(56) References Cited

U.S. PATENT DOCUMENTS

| | | | |
|---|---|---|---|
| 2009/0151903 A1 | 6/2009 | Na et al. | |
| 2017/0373359 A1* | 12/2017 | Krull | H01M 10/613 |
| 2018/0172009 A1* | 6/2018 | Hill | F04D 15/0022 |
| 2022/0403770 A1* | 12/2022 | Kim | F01P 5/10 |

FOREIGN PATENT DOCUMENTS

| | | |
|---|---|---|
| KR | 20190019178 A | 2/2019 |
| KR | 20190143218 A | 12/2019 |

* cited by examiner

INTEGRATED HOUSING AND WATER SUPPLY MODULE INCLUDING SAME

CROSS REFERENCE TO RELATED APPLICATIONS

This application is a national phase under 35 U.S.C. § 371 of International Application No. PCT/KR2021/012165 filed on Sep. 7, 2021, which claims the benefit of priority from Korean Patent Application No. 10-2020-0116884 filed on Sep. 11, 2020. The entire contents of these applications are incorporated herein by reference in their entirety.

TECHNICAL FIELD

The present disclosure relates to an integrated housing and a water supply module including the same, and more particularly, to an integrated housing capable of integrally connecting several components of a water supply module, and a water supply module including the same.

BACKGROUND ART

Recently, due to energy efficiency and environmental pollution problems, there is a demand for the development of eco-friendly vehicles that can substantially replace internal combustion engine vehicles. The eco-friendly vehicles are largely classified into electric vehicles or hydrogen vehicles that use a battery or a fuel cell as an energy source, and hybrid vehicles that are driven using an engine and a battery. Such an eco-friendly vehicle further includes an engine cooling system that manages cooling/heating or the like of the engine, and a electric cooling system that manages heat of electrical components including an electric motor.

The electric cooling system mainly cools power electronics, actuators, a hybrid start and generator (HSG), or the like, using cooling water, and has a structure that increases the temperature of the battery by causing the cooling water to bypass a radiator through a bypass circuit, and at the same time passing through the battery using waste heat of the power electronics (PE) in the cold season.

An electronic cooling system of an eco-friendly vehicle should satisfy various purposes, such as heating, cooling, and waste heat recovery, from a plurality of components, but has a problem in that due to limitations of a layout space in a vehicle, the difficulty of arranging each component, designing a hose route, and connecting them increases, in mounting each component on a vehicle, a lot of man-hours are required to individually mount and connect each component and hose, and due to the complicated route, the resistance on the cooling water side is high, and as a result, a high load is applied to the waterpump.

RELATED ART DOCUMENT

Korean Patent Publication No. 1765578 (Published on Jul. 10, 2012)

DISCLOSURE

Technical Problem

An object of the present disclosure is to integrally connect each component of a cooling system to reduce the number of parts and man-hours, increase installation convenience through modularization, reduce waterpump load, and increase expandability of parts combination.

Technical Solution

In one general aspect, a water supply module includes: an integrated housing that includes at least two or more component mounting parts formed on an outside of the housing and capable of mounting components, an internal flow path formed inside the housing and connecting the components to each other so that cooling water flows between the respective components mounted on the component mounting part, and one or more cooling water entrances communicating with the internal flow path; and at least two or more components that are mounted on the component mounting part.

A flow path changeover unit in which the internal flow path branches in multiple directions starting from one point may be formed in a space inside the integrated housing.

The integrated housing may include a waterpump that pressurizes and transfers the cooling water and a cooling water changeover valve that changes a transfer direction of the cooling water, and the waterpump and the cooling water changeover valve may share the space inside the integrated housing.

The cooling water changeover valve may be mounted to be located in the flow path changeover unit.

The cooling water changeover valve may be a multidirection changeover valve, and a direction of the multi-directional changeover valve may be changed to change the transfer direction of the cooling water in the space inside the integrated housing.

The waterpump may be mounted on both sides of the integrated housing, respectively, and the cooling water changeover valve may be mounted on a lower side of the integrated housing.

The integrated housing may further include a reservoir tank in which the cooling water is stored.

The one or more cooling water entrances may include a reservoir tank cooling water entrance through which the cooling water flows between the reservoir tank and the internal flow path, and the reservoir tank may communicate with the internal flow path through the reservoir tank cooling water entrance.

The number of reservoir tank cooling water entrances may be two or more, and among the two or more reservoir tank cooling water entrances, at least one reservoir tank cooling water entrance may communicate with an internal flow path branching in one direction starting from the flow path changeover unit, and at least one of the remaining reservoir tank cooling water entrances may communicate with an internal flow path branching in the other direction starting from the flow path changeover unit.

One side of the reservoir tank may be provided with a reservoir tank component mounting part capable of mounting at least one component.

The reservoir tank may be mounted with a cooling water branch valve branching the transfer direction of cooling water, and the cooling water branch valve may be a multi-direction valve.

One side of the reservoir tank may be provided with one or more reservoir tank cooling water entrances that makes an internal space of the reservoir tank communicate with an outside.

The reservoir tank may have a shape in which an intermediate point is bent inward, and the reservoir tank component mounting part may be provided at the intermediate point.

The cooling water branch valve may be mounted in a form seated above the intermediate point of the reservoir tank.

The reservoir tank cooling water entrance may be located below the intermediate point of the reservoir tank.

The reservoir tank may be mounted on an upper side of the integrated housing.

The cooling water entrances may include: a first cooling water entrance through which the cooling water inside the integrated housing is discharged to the outside or the cooling water is introduced from the outside into the integrated housing; and
a second cooling water entrance through which the cooling water inside the integrated housing is discharged to each of the components or the cooling water is introduced from each component into the integrated housing.

The first cooling water entrance may have a form of a pipe protruding outward from the integrated housing.

The second cooling water entrance may have a form of a through hole penetrating through the integrated housing.

An internal flow path branching in at least one direction among internal flow paths branching in multiple directions starting from the flow path changeover unit may branch again at an intermediate point.

Advantageous Effects

Through this solution, according to an integrated housing and a water supply module including the same of the present disclosure, it is possible to promote a reduction in size and weight by removing hoses or pipes or reducing a pipe length through the integration of components constituting a cooling system.

In addition, according to the present disclosure, it is possible to reduce the number of components and assembly man-hours of the cooling system, increase the convenience of installation, and improve the performance and durability of the cooling system.

In addition, according to the present disclosure, it is possible to reduce a load applied to a waterpump by lowering a water-side resistance acting on the cooling system.

In addition, it is possible to integrate products and increase expandability by using an integrated housing and a component mounting part of a reservoir tank.

BEST MODE

Hereinafter, the present disclosure will be described in detail with reference to the accompanying drawings.

A water supply module 10 of the present disclosure is a component constituting a cooling circuit of an electric cooling system of a vehicle. Each component in the conventional cooling system, that is, a reservoir tank, an electric waterpump (EWP), a cooling water valve, and the like, are individually mounted on the vehicle, and each component is connected to each other a hose to form a cooling circuit, which is integrated into a single water supply module.

To this end, a water supply module 10 of the present disclosure is configured to include an integrated housing 100 that provides a mounting structure and location where each component may be mounted and allows cooling water to flow between each mounted component.

Figure 1:
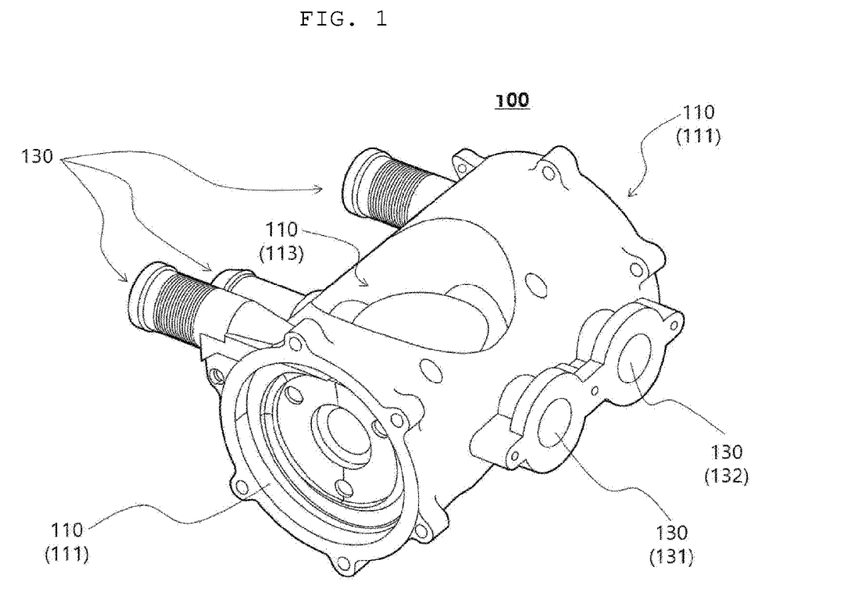
FIG. 1 is a perspective view of an integrated housing according to the present disclosure.
Figure 2:
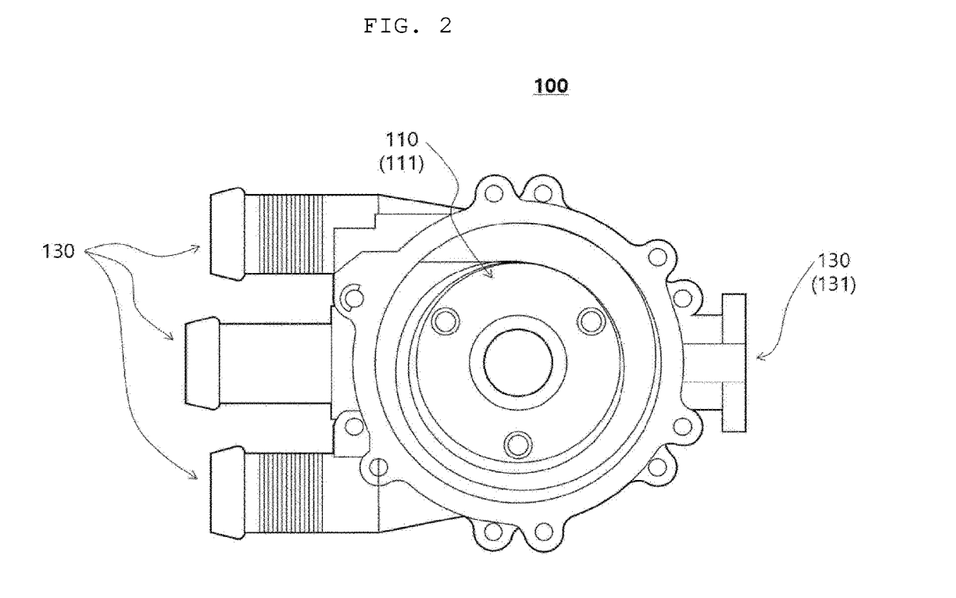
FIG. 2 is a left side view of the integrated housing according to the present disclosure.
Figure 3:
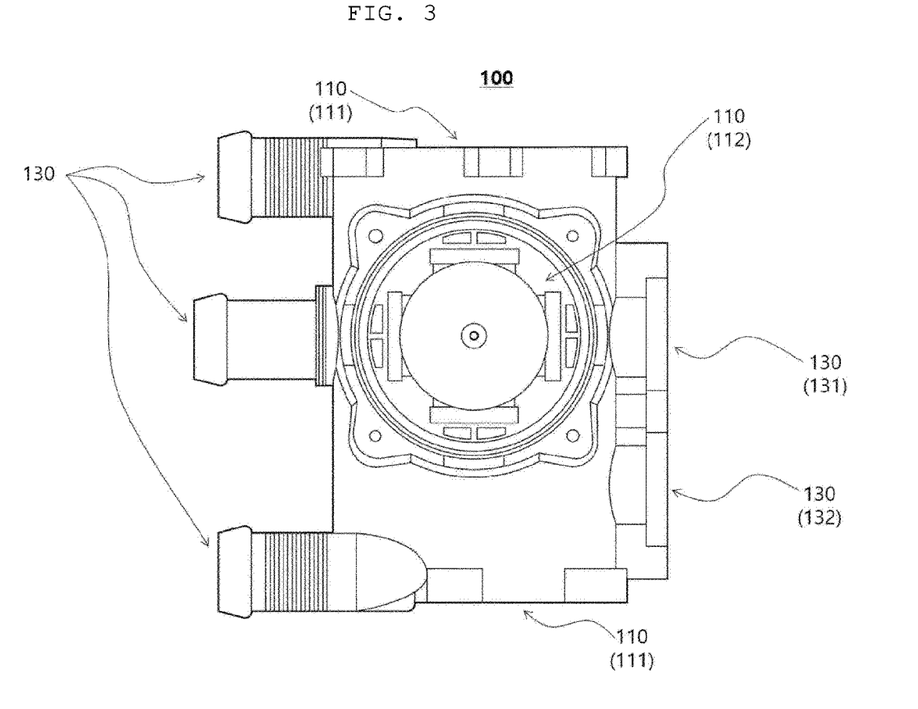
FIG. 3 is a rear view of the integrated housing according to the present disclosure.
Figure 4:
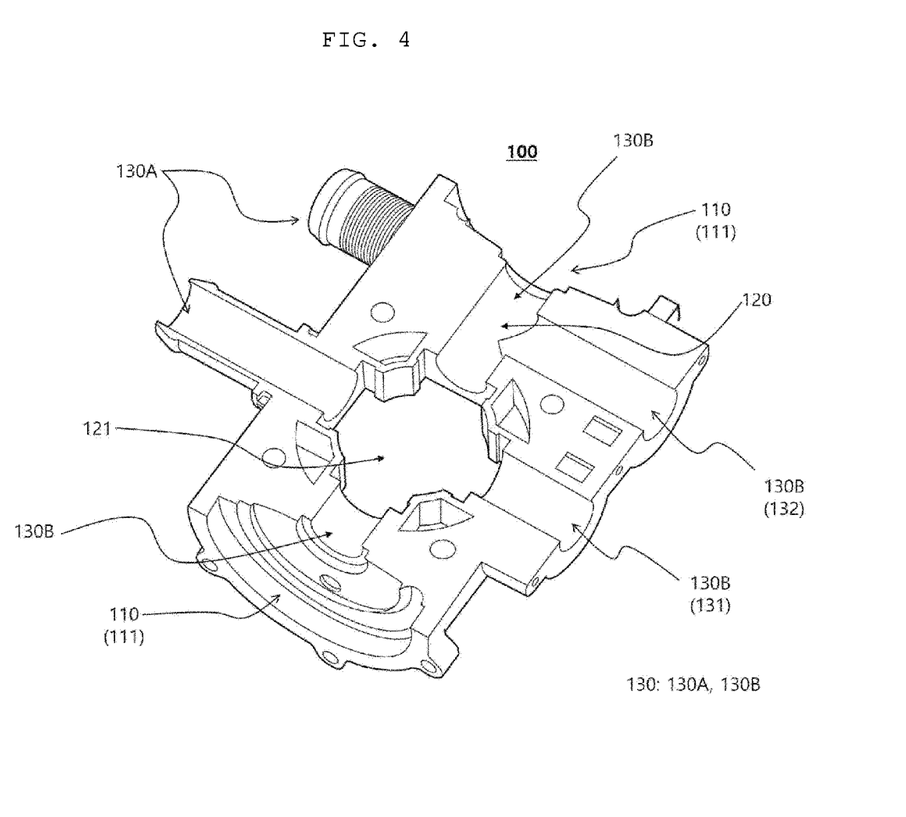
FIG. 4 is a cross-sectional view for explaining an internal flow path of the integrated housing according to the present disclosure.

FIG. 1 is a perspective view of an integrated housing according to an embodiment of the present disclosure, FIG. 2 is a left side view of FIG. 1, and FIG. 3 is a rear view of FIG. 1. Referring to FIGS. 1 to 3, an integrated housing 100 of the present disclosure is configured to include a component mounting part 110 and a cooling water entrance 130, and an inside of the integrated housing is provided with components mounted on a cooling water entrance 130 and an internal flow path 120 through which components mounted on the component mounting part 110 are connected to each other. The internal flow path 120 is illustrated in FIG. 4, which will be described later.

The component mounting part 110 is formed outside the housing constituting the integrated housing 100 and performs a function of mounting components, and at least two component mounting parts 110 may be formed. According to an example of the present disclosure, the component mounting part 110 may include a water pump mounting part 111 on which the waterpump is mounted and a cooling water changeover valve mounting part 112 on which a cooling water changeover valve is mounted. A water pump that pressurizes and transfers cooling water may be mounted on the water pump mounting part 111. In this case, the water pump mounting part 111 may be formed on both sides or one side of the water pump. When formed on both sides of the water pump, a total of two water pumps may be installed one on each side, and when formed on one side thereof, only one water pump may be mounted.

The cooling water entrance 130 is formed to communicate with the internal flow path 120, so the cooling water is discharged to each component mounted on the outside or the integrated housing 100 through the cooling water entrance 130, or the cooling water may be introduced into the inside from each component mounted on the outside or the integrated housing 100. Here, the outside refers to other components of the cooling circuit, for example, other PE components, batteries, chillers, and the like, in the cooling circuit of the electric cooling system of the vehicle. That is, other components of the cooling circuit may be connected so that the cooling water may flow between other components of the cooling circuit through the cooling water entrance 130. In this case, the cooling water entrance 130 and other components may be connected to each other through the hose.

The cooling water entrance 130 may include a first cooling water entrance 130A and a second cooling water entrance 130B. More specifically, referring to FIG. 4, the first cooling water entrance 130A is an entrance connecting the integrated housing 100 and the outside, and may serve to discharge the cooling water inside the integrated housing 100 to the outside or introduce the cooling water from the outside into the integrated housing 100, and the second cooling water entrance 130B is an entrance connecting the integrated housing and the component 200, and may serve to discharge the cooling water inside the integrated housing 100 to each component 200 or introduce the cooling water from each component 200 into the integrated housing 100.

In this case, as illustrated in FIG. 4, the first cooling water entrance may be formed in the form of a pipe protruding outward from the integrated housing, and according to this configuration, when the hose is used to connect between the other components of the cooling circuit described above, the coupling of the hose may be made easily. The second cooling water entrance may be formed in the form of a through hole penetrating through the integrated housing, and according to this configuration, the component and the internal flow path may easily communicate with each other. Meanwhile, as illustrated, the second cooling water entrance may include reservoir tank cooling water entrances 131 and 132, which will be described later.

FIG. 4 is a cross-sectional view for describing an internal flow path of an integrated housing. The internal flow path 120 is formed inside the integrated housing 100, and serves to connect components to each other so that cooling water flows between the respective components mounted on the component mounting part 110. To this end, the internal flow path 120 may be formed to communicate with each of the components mounted on the component mounting part 110. In addition, a flow path changeover unit 121 is formed at one point in the space inside the integrated housing, that is, at one point of the internal flow path 120, so that the internal flow path 120 may be formed to branch in multiple directions starting from the flow path changeover unit 121. Also, the internal flow path 120 branching in at least one direction may branch again at an intermediate point of the corresponding internal flow path. For example, as illustrated in FIG. 4, the internal flow path 120 branching from the flow path changeover unit 121 to the top right in the drawing may be formed to branch again at the intermediate point and communicate with the cooling water entrance 132.

A cooling water changeover valve for switching the transfer direction of the cooling water is mounted on the flow path changeover unit 121 formed at one point of the internal flow path 120, and the cooling water changeover valve mounted on the cooling water changeover valve mounting part may be a multidirection changeover valve. The multidirection changeover valve has input and output ports provided in at least two directions starting from the valve, and in a transfer direction of cooling water input to one port and output from another port, the transfer direction of the cooling water may be changed by changing the direction of the valve to change the port through which the cooling water is input or output.

FIG. 4 illustrates that the internal flow path 120 of the integrated housing 100 branches in 4 directions so that a 4-way changeover valve may be mounted, but is not limited thereto. Various directions, for example, 3-way, 4-way, 5-way, or 6-way changeover valves may be used, which may be appropriately selected in consideration of the circuit configuration of the entire cooling circuit. However, for convenience of description, a 4-way changeover valve will be described below as an example. Meanwhile, the changeover valve may be driven by manual, mechanical, hydraulic/pneumatic, electronic, electro-hydraulic/pneumatic operation methods.

Here, in the integrated housing 100 of the present disclosure, the waterpump mounted on the water pump mounting part 110 and the cooling water changeover valve mounted on the cooling water changeover valve mounting part 120 may be formed to share the space inside the integrated housing 100. That is, the water pump and the cooling water changeover valve may share the internal space of the integrated housing 100 so that the water pump and the cooling water changeover valve may communicate with each other through the internal flow path 120 to make the cooling water flow between the water pump and the cooling water changeover valve.

As described above, the flow path changeover unit 121 may be formed in the space inside the integrated housing 100, that is, at one point of the internal flow path 120. The flow path changeover unit 121 means one point of the internal flow path 120 in which the transfer path of the cooling water is converted by changing the transfer direction of the cooling water by the cooling water changeover valve mounted on the cooling water changeover valve mounting part 120, and the internal flow path 120 may branch starting from the flow path changeover unit 121.

As the internal flow path 120 branches by the flow path changeover unit 121, the transfer path of the cooling water may be converted starting from the flow path changeover unit 121. For example, the cooling water changeover valve is mounted on the cooling water changeover valve mounting part 120 formed on the lower side of the integrated housing 100, and the valve part of the cooling water changeover valve is inserted into the flow path changeover unit 121 of the internal flow path 120 to be mounted, so the transfer direction of the cooling water may be changed in the space inside the integrated housing starting from the flow path changeover unit 121 according to the valve changeover of the cooling water changeover valve.

Figure 5:
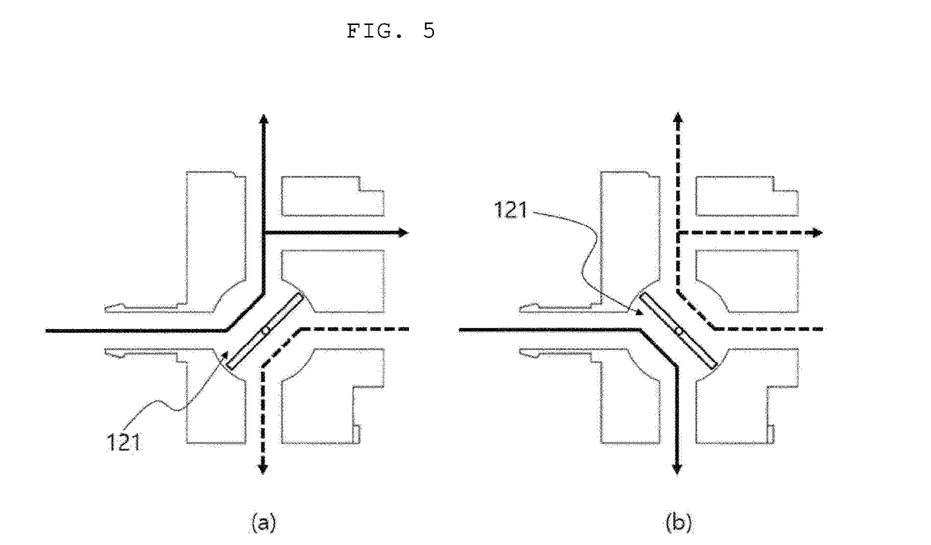
FIG. 5 is a conceptual diagram for explaining that a transfer path of cooling water is changed starting from a flow path changeover unit.

FIG. 5 is a conceptual diagram for describing that the transfer path of cooling water is changed starting from the flow path changeover unit, and illustrates that the cooling water changeover valve is inserted into the flow path changeover unit 121. More specifically, FIG. 5A illustrates the transfer path of cooling water when the changeover valve points to a first direction, and FIG. 5B illustrates the transfer path of cooling water when the changeover valve points to a second direction. As an illustrated example, when the cooling water changeover valve is the 4-way changeover valve, the changeover valve may include an upper port, a left port, a right port, and a lower port in each direction based on the drawings.

In this case, as illustrated in FIG. 5A, when the changeover valve points to the first direction, the left port and the upper port communicate with each other, the right port and the lower port communicate with each other, and the left port and the upper port do not communication with the right port and the lower port. Accordingly, the cooling water flowing into the left port of the cooling water changeover valve indicated by a solid line is transferred upward starting from the flow path changeover unit 121, and the cooling water flowing into the right port of the cooling water changeover valve indicated by a dotted line may be transferred downward starting from the flow path changeover unit 121.

Here, as illustrated in FIG. 5B, when the changeover valve points to the second direction through the direction change of the changeover valve, the upper port and the right port are in communication, the left port and the lower port communicate with each other, and the upper port and the right port and the left port and the lower port do not communicate with each other. Accordingly, the cooling water flowing into the left port of the cooling water changeover valve indicated by a solid line is transferred downward starting from the flow path changeover unit 121, and the cooling water flowing into the right port of the cooling water changeover valve indicated by a dotted line may be transferred upward starting from the flow path changeover unit 121.

In this way, in the integrated housing 100 of the present disclosure, the internal flow path 120 branches starting from the flow path changeover unit 121, and the cooling water flows in the branching internal flow path 120 in each direction. As the transfer direction of the cooling water is changed through the flow path changeover unit 121, it is possible to control the transfer path of the cooling water in a desired direction by easily changing the path of the cooling circuit in the cooling system.

Furthermore, the present disclosure may further include a reservoir tank mounting part 113 on which the reservoir tank is mounted. A reservoir tank for storing cooling water may be mounted on the reservoir tank mounting part 113, and the reservoir tank mounting part 113 may be formed on an upper side of the integrated housing 100.

Here, the reservoir tank mounted on the reservoir tank mounting part 113 may communicate with the internal flow path 120 of the integrated housing 100 through the cooling water entrance 130 of the integrated housing 100. Referring to FIGS. 1 and 4, the cooling water entrance 130 of the integrated housing 100 may include reservoir tank cooling water entrances 131 and 132, and the reservoir tank cooling r entrances 131 and 132 may communicate with the reservoir tank mounted on the reservoir tank mounting part 113 to allow the cooling water to flow between the reservoir tank and the internal flow path 120.

In this case, there are at least two reservoir tank cooling water entrances 131 and 132, and among the two or more reservoir tank cooling water entrances 131 and 132, at least one reservoir tank cooling water entrance 131 may communicate with the internal flow path 120 branching in one direction, and the other reservoir tank cooling water entrances 132 may communicate with any one internal flow path 120 branching in the other direction. This may be appropriately designed in consideration of the cooling circuit of the cooling system.

As described above, the integrated housing 100 of the present disclosure may drastically reduce the package of the electric cooling system of the vehicle. That is, as the components constituting the cooling system can be integrated, it is possible to remove hoses or pipes or reduce a pipe length, promote a reduction in size and weight, and reduce the number of parts and man-hours. Furthermore, it is possible to simplify the configuration of the cooling circuit of the cooling system is simplified, and as the circuit path may be easily changed through the flow path changeover unit of the integrated housing, it is possible to reduce the number of cooling circuits.

Hereinafter, the water supply module including the integrated housing of the present disclosure will be described with reference to FIGS. 6 to 9.

Figure 6:
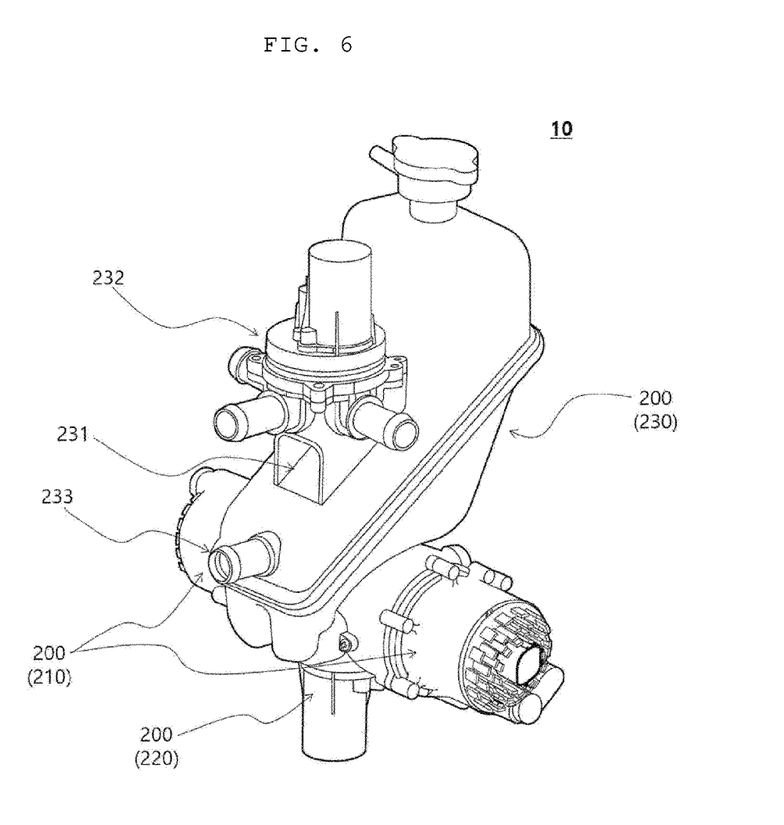
FIG. 6 is a front perspective view of a water supply module according to the present disclosure.
Figure 7:
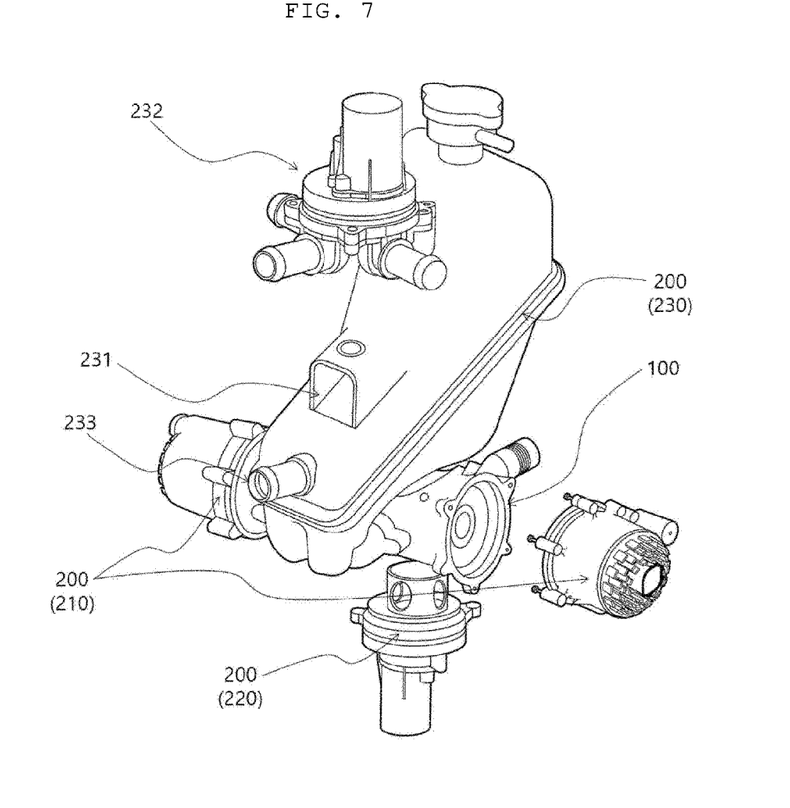
FIG. 7 is an exploded perspective view of the water supply module according to the present disclosure.
Figure 8:
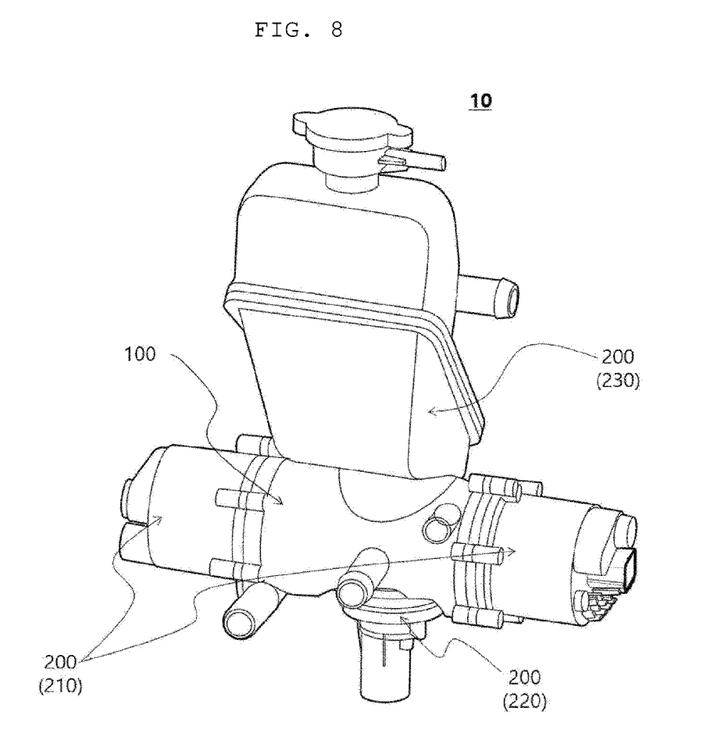
FIG. 8 is a rear perspective view of the water supply module according to the present disclosure.
Figure 9:
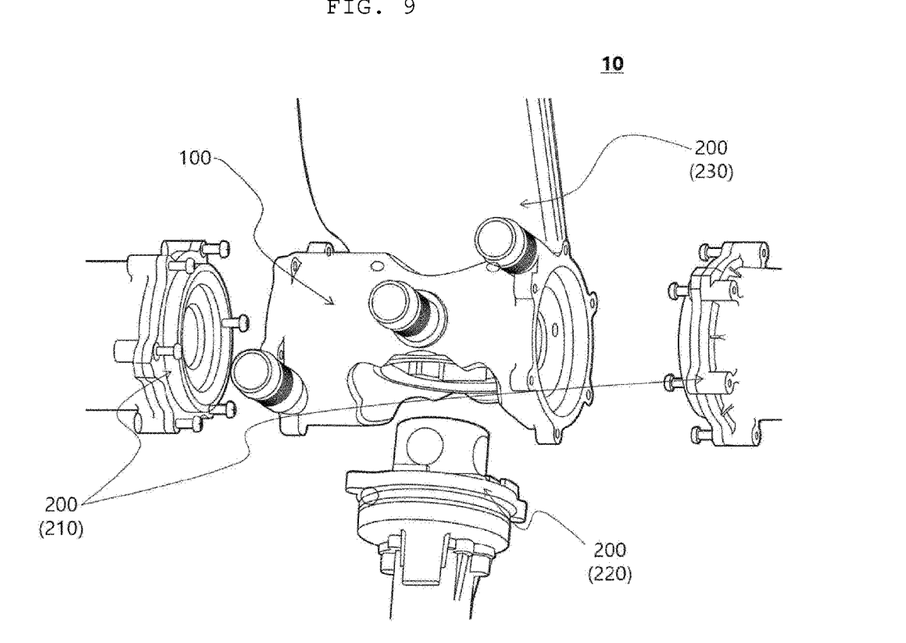
FIG. 9 is an exploded perspective view of FIG. 7.

FIG. 6 is a front perspective view of the water supply module according to the present disclosure, FIG. 7 is an exploded perspective view of FIG. 6, FIG. 8 is a rear perspective view of the water supply module according to the present disclosure, and FIG. 9 is an exploded enlarged perspective view of FIG. 8. As illustrated, the water supply module 10 of the present disclosure includes the integrated housing 100 and the component 200.

The integrated housing 100 includes at least two or more component mounting parts formed on an outside of the housing and capable of mounting components, an internal flow path formed inside the housing and connecting the components to each other so that cooling water flows between the respective components mounted on the component mounting part; and one or more cooling water entrances communicating with the internal flow path.

The component 200 may be a water supply module component of at least one of a water pump 210 that pressurizes and transfers cooling water, a cooling water valve 220 that changes the transfer direction of the cooling water, and a reservoir tank 230 in which the cooling water is stored.

The water supply module 10 according to the present disclosure may include the integrated housing 100, the water pump 210 mounted on the component mounting part of the integrated housing, and the cooling water changeover valve 220.

The water pump 210 is mounted on both sides or one side of the integrated housing 100, the cooling water changeover valve 220 is mounted on the lower side of the integrated housing 100, and the water pump 210 and the cooling water changeover valve 220 may share the space inside the integrated housing 100. Of course, the water pump 210 may be mounted on the water pump mounting part formed on both sides or one side of the integrated housing among the component mounting parts, and the cooling water changeover valve 220 may be mounted on the cooling water changeover valve mounting part formed on the lower side of the integrated housing.

Here, in the space inside the integrated housing 100, a flow path changeover unit may be formed to allow the cooling water changeover valve 210 to change the transfer direction of the cooling water to change the transfer path of the cooling water, and the internal flow path may branch starting from the flow path changeover unit.

In this case, the cooling water changeover valve 210 may be a multidirection changeover valve, and as the direction of the multidirection changeover valve is changed and the transfer direction of the cooling water is changed, the transfer path of the cooling water may be changed.

Furthermore, in the water supply module 10 according to the present disclosure, the reservoir tank 230 may be further mounted on the upper side of the integrated housing 100. Of course, the reservoir tank 230 may be mounted on the reservoir tank mounting part 113 formed on the upper side of the integrated housing 100 among the component mounting parts.

In this case, the cooling water entrance of the integrated housing 100 may include the reservoir tank cooling water entrances 131 and 132 that communicate with the reservoir tank 230 to allow the cooling water to flow between the reservoir tank 230 and the internal flow path, and as a result, the reservoir tank 230 may communicate with the internal flow path through the reservoir tank cooling water entrances 131 and 132.

Here, there may be at least two reservoir tank cooling water entrances 131 and 132, and among the two or more reservoir tank cooling water entrances 131 and 132, at least one reservoir tank cooling water entrance 131 may communicate with the internal flow path branching in one direction, and the other reservoir tank cooling water entrance 132 may communicate with the internal flow path branching in the other direction.

Furthermore, as illustrated in FIG. 7, at least one reservoir tank component mounting part 231 on which the reservoir tank component 232 may be mounted may be further formed on one surface of the reservoir tank 230. More specifically, as illustrated in FIG. 7, the reservoir tank component mounting part 231 may include a cooling water branch valve mounting part 231 formed above the reservoir tank 230, and the cooling water branch valve mounting part 231 may be mounted with a cooling water branch valve 232 for branching the transfer direction of cooling water. In this case, the cooling water branch valve 232 may be a multidirection valve. For example, as illustrated in FIG. 6, a 3-way branch valve may be mounted on the reservoir tank 230, and the cooling water branch valve mounting part 231 may be formed in a bracket structure to mount the cooling water branch valve 232.

In this way, as the reservoir tank component mounting part 231 is additionally provided in the reservoir tank 230, it is possible to additionally include the components in the water supply module 10 to improve component integration scalability, thereby maximizing the space efficiency and further integrating the cooling circuit of the cooling system.

Furthermore, at least one reservoir tank cooling water entrance 233 communicating with the inside of the reservoir tank 230 may be further provided on the other side of the reservoir tank 230. For example, as illustrated in FIG. 7, the reservoir tank cooling water entrance 233 may be provided at the front lower part of the reservoir tank 230, so the cooling circuit path may be constructed in more various ways.

In addition, the reservoir tank 230 may have a shape in which the intermediate point is bent inward, and the mounting part 231 for the reservoir tank may be provided at the corresponding intermediate point, so the cooling water branch valve 232 may be mounted in a form seated above the intermediate point of the reservoir tank. Accordingly, as additional components are mounted on the bent part of the reservoir tank, it is possible to reduce a space occupied by additional components and enable more intensive space utilization.

Hereinafter, examples of various cooling circuits configured using the water supply module 10 described above will be described.

Figure 10:
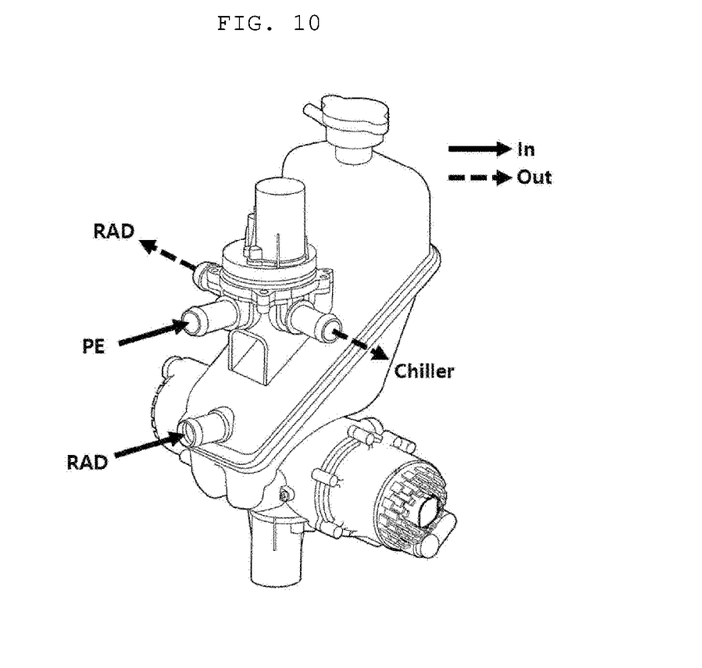
FIGS. 10 and 11 are diagrams illustrating inflow and outflow paths of cooling water in the water supply module.
Figure 11:
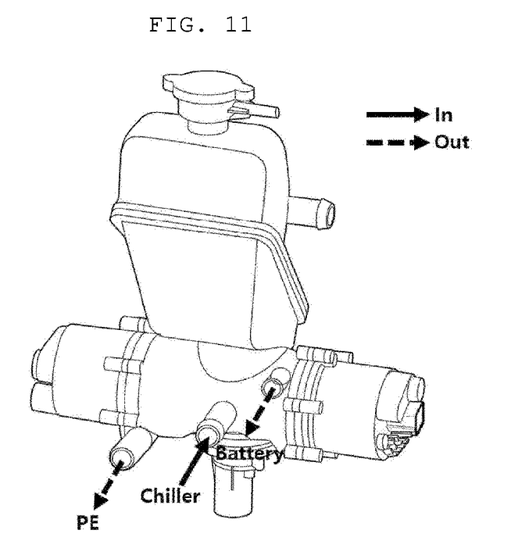

FIGS. 10 and 11 illustrate inflow and outflow paths of cooling water in the water supply module, FIGS. 12 to 16 illustrate various cooling circuit paths when the cooling water changeover valve is a 4-way valve, and FIGS. 16 to 19 illustrate various cooling circuit paths when the cooling water changeover valve is a 5-way valve.

As illustrated in FIG. 10, cooling water of a radiator (RAD) may flow into the reservoir tank 230 through the reservoir tank cooling water entrance 233, the cooling water of the PE component (PE) may flow into the reservoir tank 230 through the cooling water branch valve 232 of the reservoir tank, and the cooling water may be discharged to the radiator RAD and the chiller through the cooling water branch valve 232 of the reservoir tank.

In addition, as illustrated in FIG. 11, the cooling water of the chiller may be introduced into the integrated housing 100 through one of a plurality of cooling water entrances 130, and the cooling water may be discharged to PE components (PE) and batteries, respectively, through the remaining cooling water entrances 130.

Figure 12:
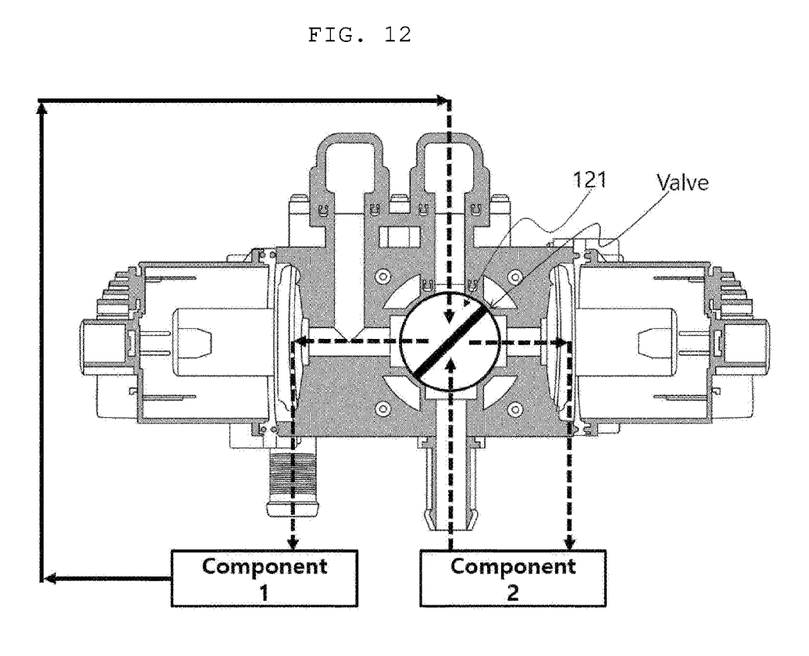
FIGS. 12 to 16 are diagrams illustrating various cooling circuit paths when a cooling water changeover valve is a 4-way valve.
Figure 13:
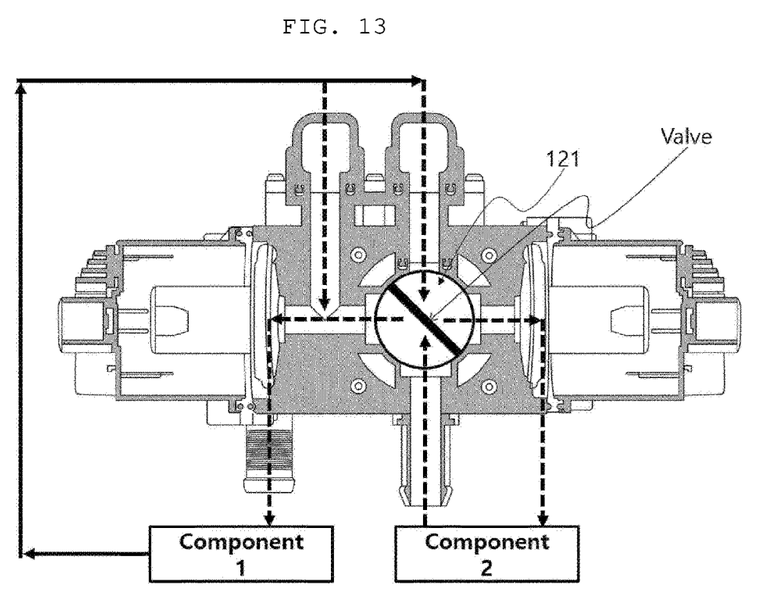
Figure 14:
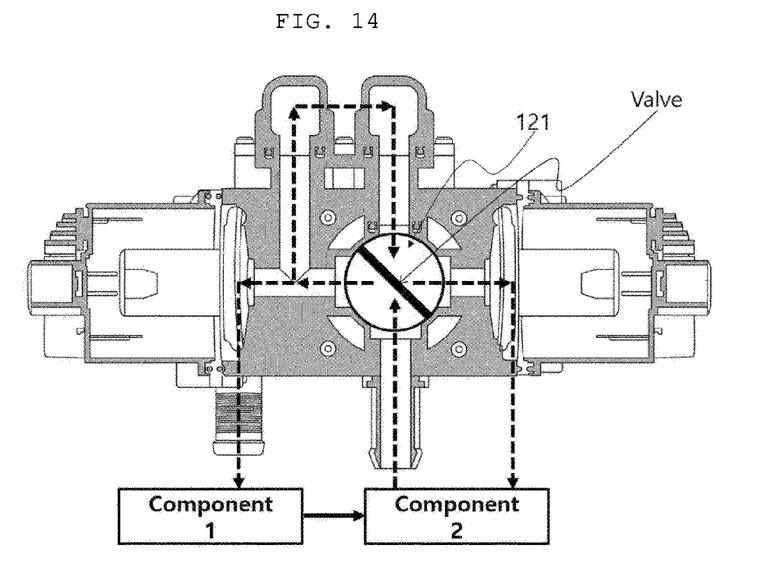
Figure 15:
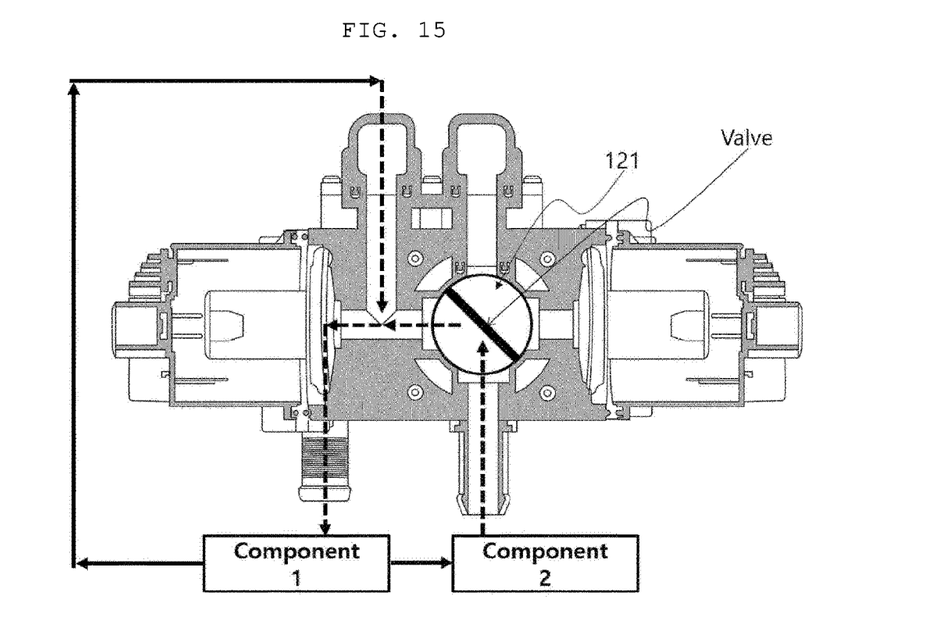

FIGS. 12 to 15 illustrate that various cooling circuits are configured using the 4-way cooling water changeover valve 220 in the flow path changeover unit 121, FIG. 12 illustrates an example of divided circulation in which cooling water is circulated through components 1 and 2, FIG. 13 illustrates an example of large circulation, FIG. 14 illustrates an example of bypass circulation, and FIG. 15 illustrates another example of bypass circulation.

Figure 16:
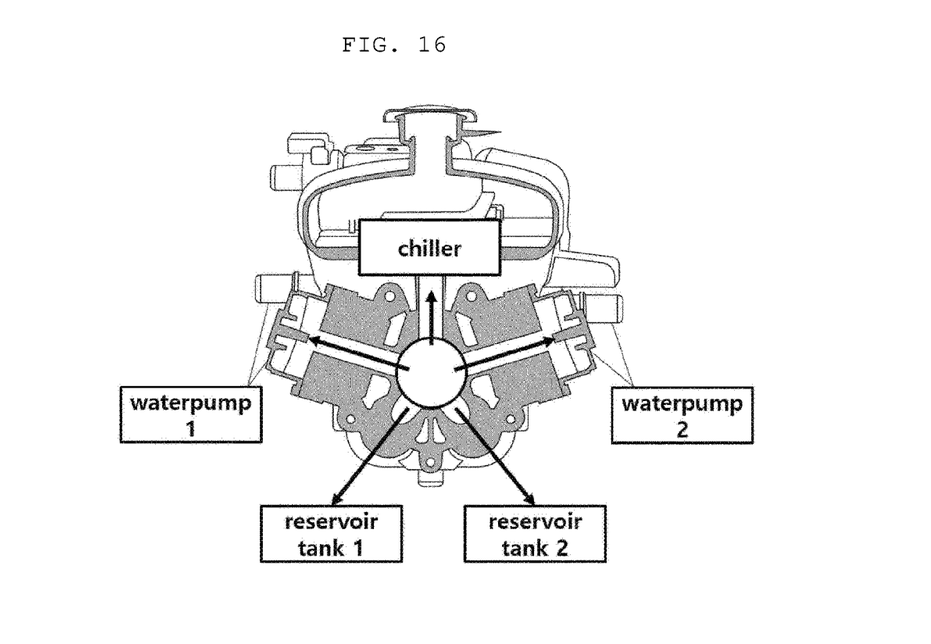
Figure 17:
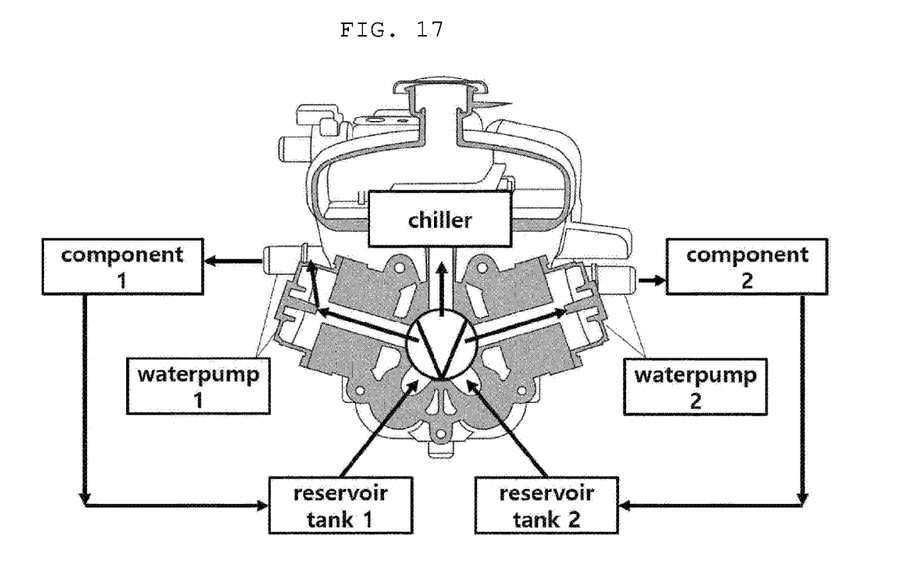
FIGS. 17 to 19 are diagrams illustrating various cooling circuit paths when the cooling water changeover valve is a 5-way valve.
Figure 18:
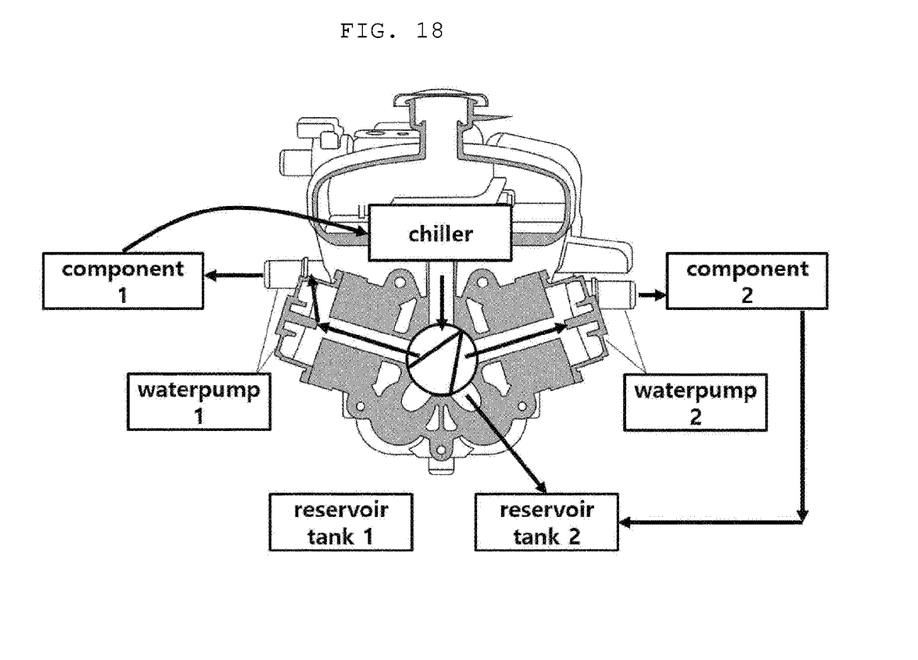
Figure 19:
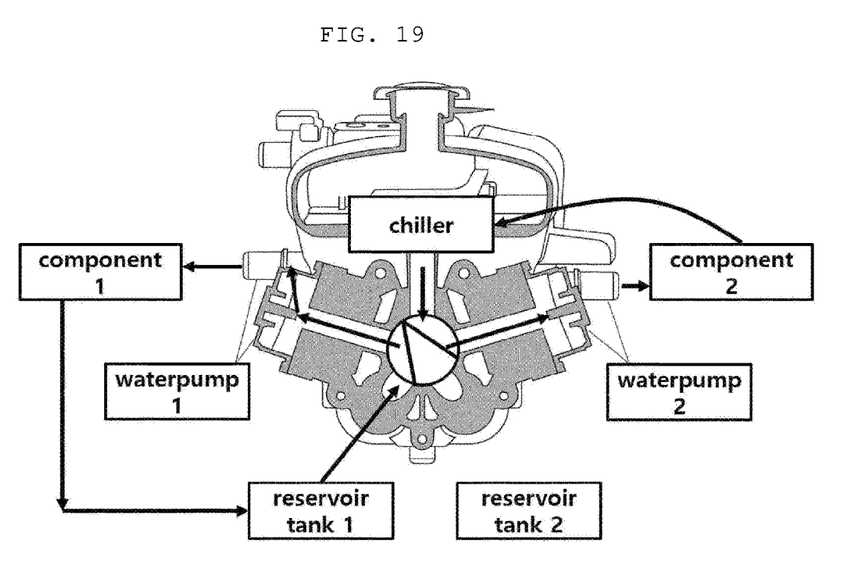

FIGS. 16 to 19 illustrate that various cooling circuits are configured using the 5-way cooling water changeover valve 220 in the flow path changeover unit 121, FIG. 16 illustrates an example of basic circulation, FIG. 17 illustrates an example of component circulation through components 1 and 2, FIG. 18 illustrates example of chiller circulation, and FIG. 19 illustrates another example of chiller circulation.

As described above, according to the present disclosure, the cooling circuit of the cooling system may be freely configured through the direction change of the cooling water changeover valve 220, which is various types of multidirection changeover valves, thereby significantly reducing the overall packaging size of the vehicle electric cooling system as well as increasing the degree of freedom to configure the cooling circuit of the vehicle.

Hereinabove, although the present disclosure has been described with reference to exemplary embodiments, the present disclosure is not limited thereto, but may be variously modified and altered by those skilled in the art to which the present disclosure pertains without departing from the spirit and scope of the present disclosure claimed in the following claims.

DESCRIPTION OF REFERENCE SIGNS

10: Water supply module
100: Integrated housing
110: Component mounting part
111: Waterpump mounting part
112: Cooling water changeover valve mounting part
113: Reservoir tank mounting part
120: Internal flow path
121: Flow path changeover unit
130: Cooling water entrance
130A: First cooling water entrance
130B: Second cooling water entrance
131, 132: Reservoir tank cooling water entrance
200: Component
210: Waterpump
220: Cooling water changeover valve
230: Reservoir tank
231: Reservoir tank component mounting part (cooling water branch valve mounting part)
232: Reservoir tank component (cooling water branch valve)
233: Reservoir tank cooling water entrance

The invention claimed is:

1. A water supply module, comprising: an integrated housing that includes at least two or more component mounting parts formed on an outside of the housing and capable of mounting components, an internal flow path formed inside the housing and connecting the components to each other so that cooling water flows between the respective components mounted on the component mounting part, and one or more cooling water entrances communicating with the internal flow path; at least two or more components that are mounted on the component mounting part; and a reservoir tank in which the cooling water is stored; wherein a flow path changeover unit in which the internal flow path branches in multiple directions starting from one point is formed in a space inside the integrated housing; wherein the integrated housing includes a waterpump that pressurizes and transfers the cooling water and a cooling water changeover valve that changes a transfer direction of the cooling water; wherein the waterpump and the cooling water changeover valve share the space inside the integrated housing; wherein the one or more cooling water entrances include a reservoir tank cooling water entrance through which the cooling water flows between the reservoir tank and the internal flow path; wherein the reservoir tank communicates with the internal flow path through the reservoir tank cooling water entrance which only communicate with the reservoir tank; wherein the number of reservoir tank cooling water entrances is two or more; wherein among the two or more reservoir tank cooling water entrances, at least one reservoir tank cooling water entrance directly communicates with an internal flow path that branches in a first direction starting from the flow path changeover unit; and wherein at least one of the remaining reservoir tank cooling water entrances directly communicates with an internal flow path that branches in a second direction starting from the flow path changeover unit, wherein the two reservoir tank cooling water entrances are disposed on the same side of the integrated housing and extend parallel to one another, and wherein the second direction is perpendicular to the first direction.

2. The water supply module of claim 1, wherein the cooling water changeover valve is mounted to be located in the flow path changeover unit.

3. The water supply module of claim 2, wherein the cooling water changeover valve is a multidirection changeover valve, and
  a direction of the multi-directional changeover valve is changed to change the transfer direction of the cooling water in the space inside the integrated housing.

4. The water supply module of claim 1, wherein the waterpump is mounted on both sides of the integrated housing, respectively, and
  the cooling water changeover valve is mounted on a lower side of the integrated housing.

5. The water supply module of claim 2, wherein the wherein the cooling water changeover valve is a multidirection changeover valve.

6. The water supply module of claim 1, wherein one side of the reservoir tank is provided with a reservoir tank component mounting part capable of mounting at least one component.

7. The water supply module of claim 6, wherein the reservoir tank is mounted with a cooling water branch valve branching the transfer direction of cooling water, and the cooling water branch valve is a multidirection valve.

8. The water supply module of claim 7, wherein one side of the reservoir tank is provided with one or more reservoir tank cooling water entrances that makes an internal space of the reservoir tank communicate with an outside.

9. The water supply module of claim 8, wherein the reservoir tank has a shape in which an intermediate point is bent inward, and the reservoir tank component mounting part is provided at the intermediate point.

10. The water supply module of claim 9, wherein the cooling water branch valve is mounted in a form seated above the intermediate point of the reservoir tank.

11. The water supply module of claim 9, wherein the reservoir tank cooling water entrance is located below the intermediate point of the reservoir tank.

12. The water supply module of claim 1, wherein the reservoir tank is mounted on an upper side of the integrated housing.

13. The water supply module of claim 1, wherein the cooling water entrances includes:
  a first cooling water entrance through which the cooling water inside the integrated housing is discharged to the outside or the cooling water is introduced from the outside into the integrated housing; and
  a second cooling water entrance through which the cooling water inside the integrated housing is discharged to each of the components or the cooling water is introduced from each component into the integrated housing.

14. The water supply module of claim 13, wherein the first cooling water entrance has a form of a pipe protruding outward from the integrated housing.

15. The water supply module of claim 13, wherein the second cooling water entrance has a form of a through hole penetrating through the integrated housing.

16. The water supply module of claim 1, wherein an internal flow path branching in at least one direction among internal flow paths branching in multiple directions starting from the flow path changeover unit branches again at an intermediate point.

* * * * *